July 6, 1943.  H. H. DOERING ET AL  2,323,523
MOLDING APPARATUS FOR INDIVIDUAL EDIBLE SPREADS
Filed March 27, 1939  2 Sheets-Sheet 1
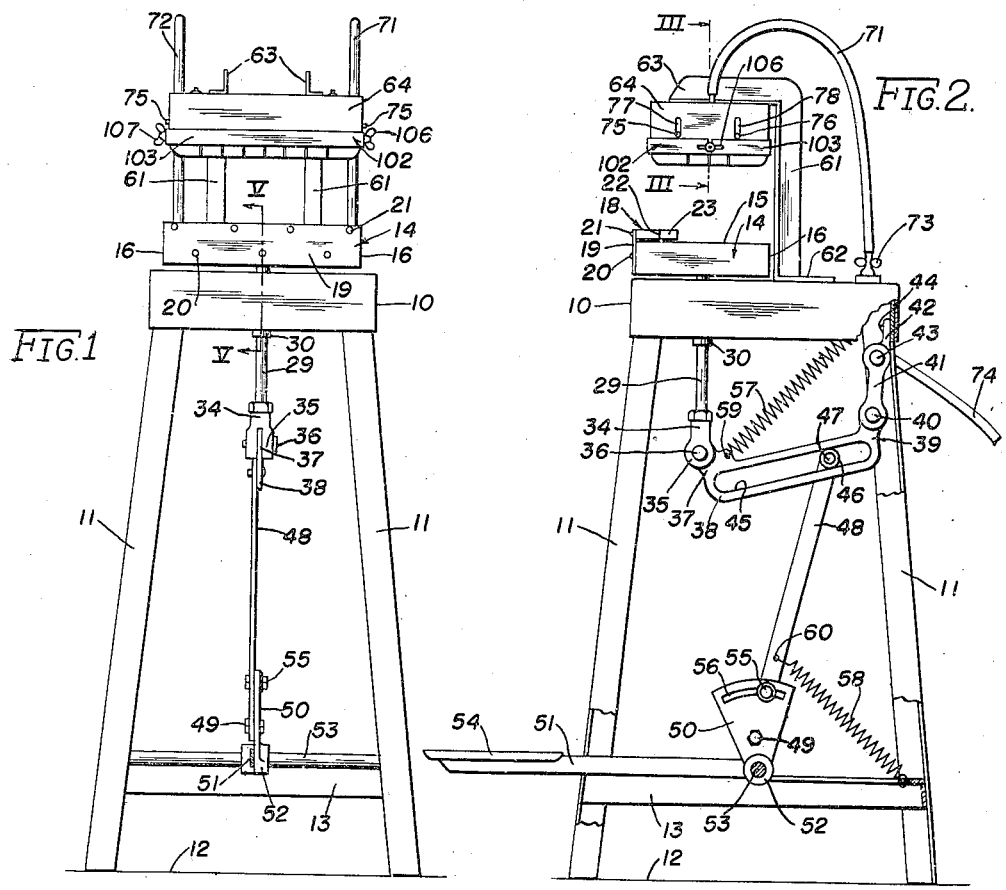
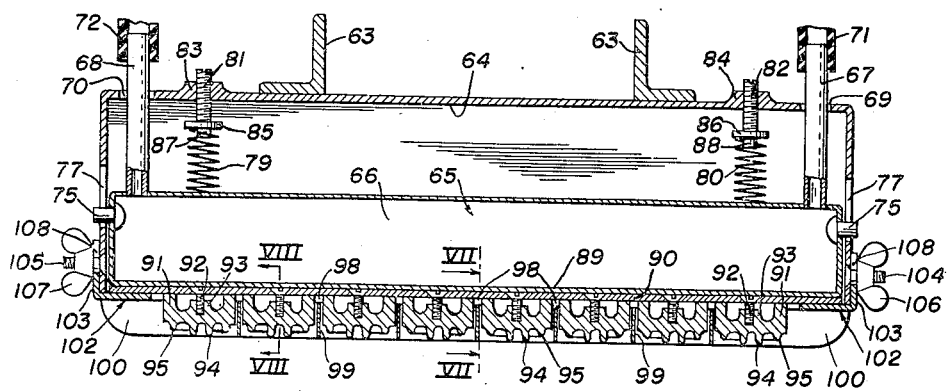
INVENTORS.
HENRY H. DOERING
BERT J. SKOGLUND.
BY Harry P. Levinton
ATTORNEY.

July 6, 1943.  H. H. DOERING ET AL  2,323,523
MOLDING APPARATUS FOR INDIVIDUAL EDIBLE SPREADS
Filed March 27, 1939   2 Sheets-Sheet 2

INVENTORS.
HENRY H. DOERING
BERT J. SKOGLUND.
BY
ATTORNEY.

Patented July 6, 1943

2,323,523

UNITED STATES PATENT OFFICE 2,323,523

MOLDING APPARATUS FOR INDIVIDUAL
EDIBLE SPREADS

Henry H. Doering and Bert J. Skoglund, Chicago, Ill., assignors to Charles Doering and Henry H. Doering, both of Chicago, Ill.

Application March 27, 1939, Serial No. 264,412

11 Claims. (Cl. 31—7)

This invention relates to molding devices and more particularly to combined cutting and molding instrumentalities for converting edible plastic slabs into polygonal units of varied surface design, although certain features thereof may be employed with equal advantage for other purposes.

It contemplates more especially the provision of molding and cutting instrumentalities combined to convert edible plastics into polygonal units in a single operation for effecting the severance of plastic slabs into palatable segments of pleasing appearance.

It has been customary to form edible plastics such as butter and kindred edible substances into rectangular bricks of varying weights; however, there necessitated transverse and longitudinal severance with auxiliary devices to create rectangular segments primarily for restaurant purposes. This not only entails much labor in the preparation thereof for serving to the consumer, but also the contour thereof is only utilitarian which does not enhance the appearance thereof, an important factor in pleasing the taste of the individual consumer.

The novel formation of edible plastics into adhering units of varied design imparts a continuous polygonal effect, serves to impart a more pleasant appearance thereto, and also eliminates considerable labor heretofore necessary in producing palatable segments thereof. Edible plastics produced in accordance with the teachings of the present invention require a single operating stroke severance and surface design formation, this being distinguished from the usual method of longitudinal and then transverse division of bricks into multiple segments of usual rectangular shape without any possible surface design that is not altogether advantageous for restaurant purposes.

One object of the present invention is to provide an improved combined printing and cutting mechanism that is more simple in construction and operation.

Another object is to provide a simple device for effecting the formation of edible plastic slabs into a plurality of multiple segments of any selected surface design to render such more palatable and attractive.

Still another object is to provide improved means for segmenting edible plastic slabs into a multiple of associated units.

A further object is to provide a novel combination of segmenting, surface impressing, and ejecting instrumentalities combined for converting edible plastic slabs into multiple segments having any selected surface design thereon.

A still further object is to provide a novel combination of segmenting, surface impressing and ejecting instrumentalities combined for single stroke operation to convert edible plastic slabs into segments having any selected surface design thereon.

Still a further object is to provide novel molding, cutting, and ejecting instrumentalities in combination with thermal control means therefor to convert edible plastic slabs into multiple segments having any selected surface design thereon.

Other objects and advantages will appear from the following description of an illustrative embodiment of the present invention.

In the drawings:

Figure 1 is a front view in elevation of a device embodying features of the present invention.

Figure 2 is a side view in elevation of the device shown in Figure 1.

Figure 3 is a sectional view of combined molding, cutting, ejecting and thermal control means taken substantially along line III—III of Figure 2.

Figure 4:
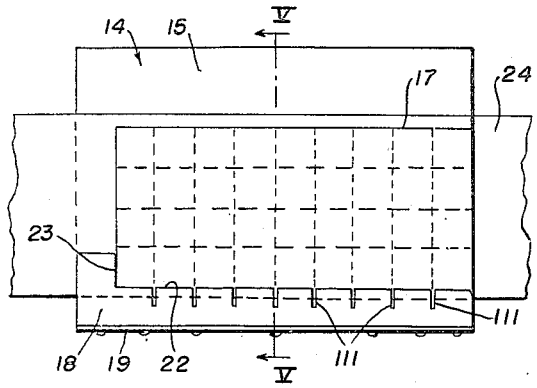
Figure 4 is a fragmentary plan view of a press base for supporting a slab of edible plastics in order to impress, cut, and convert such into multiple segments having a surface design thereon.

The structure selected for illustration comprises a horizontal frame member 10 of substantially rectangular configuration which is supported at the desired elevation by a plurality of corner standards 11, in this instance four, that preferably though not essentially comprise angle irons attached at their upper ends to the frame member 10 by welding, riveting or other suitable fastening expedients. In the present embodiment, the standards 11 are inclined to converge upwardly toward the frame member 10 in order to serve as a rigid support therefor at any desired elevation from a supporting surface such as a floor 12.

To maintain the corner standards 11 in their desired spaced relation and to rigidify the support of the base member 10, cross members 13 comprising angle irons are welded or otherwise joined to the corner standards 11 proximate to the lower extremities thereof. This reinforces the standards and provides a durable frame for the elevated support of the frame member 10. To serve as a support for edible slabs of plastic material, a substantially flat rectangular platen 14 is disposed above the frame member 10 for vertical reciprocal movement relative thereto.

Figure 5:
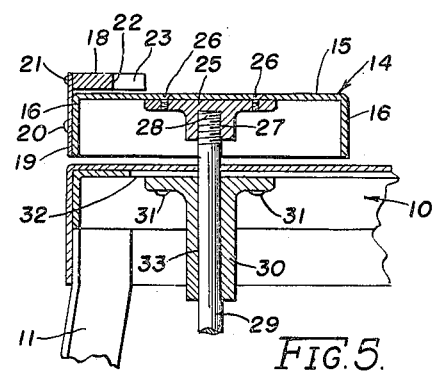
Figure 5 is a fragmentary sectional view taken substantially along line V—V of Figures 1 and 4.
Figure 9:
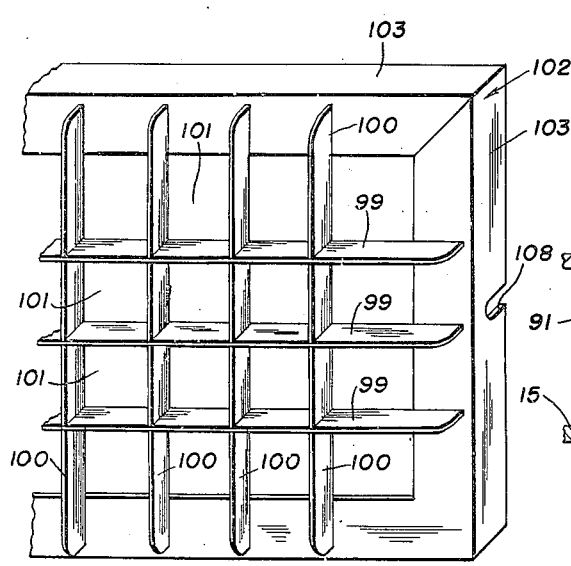
Figure 9 is a fragmentary perspective view of the cutter blades and instrumentalities that serve to retain the individual segments in position for impression by the molding instrumentalities in a single operation.

As shown, the platen 14 has a flat upper surface 15 and depending side walls 16 (Figure 5) that define the periphery thereof. In order to maintain a slab of plastic material 17 in the desired position on the platen surface 15 and to serve as a guide therefor, a substantially L-shaped trip member 18 is disposed slightly above the platen surface 15 for support along the forward side wall thereof. To this end, a bracket plate 19 is anchored to the forward side wall of the platen 14 as at 20 to project above the flat platen surface 15 and serve as a support for the guide member 18. The bracket plate 19 is secured to the guide member 18 as at 21 so that the normally disposed edges 22 and 23 of the guide member 18 will constitute a complement of corresponding extending edges of a slab of plastic material 17.

It is to be noted that the plastic material 17 is first cut or otherwise shaped into preformed rectangular slabs of uniform size so that the guide member 18 will serve as a position indicator therefor on the flat platen surface 15. It is preferable though not essential that the edible plastic slabs 17 be deposited on a sanitary paper liner 24 of parchment or other suitably processed paper adaptable for that purpose, thereby precluding the plastic slabs 17 from directly contacting the upper flat platen surface 15.

In order to enable the vertical reciprocation of the platen 14, a circularly flanged boss 25 is riveted or otherwise secured as at 26 to the underside of the platen surface 15. The boss 25 is provided with an axial bore 27 that is engaged by a threaded extremity 28 of a rod link 29 that is reciprocally journalled in a vertical bearing 30. The vertical bearing 30 depends from and is riveted or anchored as at 31 to the underside 32 of the frame member 10 so that its internal guide bore 33 is in axial alignment with the bore 27 in the platen boss 25, thereby guiding the reciprocation of the platen 14 as will presently appear.

The lower extremity of the link 29 is threaded or otherwise secured to a boss 34 having a flat arcuate extremity 35 that is transversely bored to receive a pin 36 that correspondingly engages one extremity 37 of a crank arm 38. The crank arm 38 has its other extremity 39 pivoted as at 40 to a link 41. The link 41 pivotally engages a bracket 42 that is mounted to the frame member 10 (Figure 2) to serve as a mounting for pin 43 about which the link 41 is pivotally supported. As shown, the bracket plate 42 is riveted or otherwise secured to the frame member 10 as at 44 to serve as an anchoring expedient for the crank arm 38 that is oscillated in a manner which will be described hereinafter.

The crank arm 38 is provided, in this instance, with an elongated slot 45 that extends for substantially the entire length thereof to receive a roller 46 serving as a complement thereof. The roller 46 is journalled on a pin 47 anchored in the upper extremity of a pitman or connecting rod 48. The lower extremity of the pitman member 48 is pivoted as at 49 to a segmental plate 50 constituting a lever arm of a pedal member 51. A boss 52 joins the pedal member 51 with the segmental lever arm 50 to receive a stub shaft 53 therethrough. The stub shaft 53 is mounted between parallel cross members 13 so that the depression of the pedal member 51 will impart corresponding movement to its lever arm 50 to oscillate the pitman 48.

To this end, the pedal member 51 has an enlarged tread member 54 provided on the extremity thereof to enable effective pedal depression to elevate the rod link 29 and the platen 14 that is operatively connected thereto. To maintain the pitman 48 adjacent the pedal arm 50 during operation thereof, a pin 55 is anchored in the pitman 48 to project through an arcuate slot 56 pivoted in the segmental plate arm 50 to serve as a guide therefor to retain the roller 46 in the path of the slot 45 provided in the crank arm 38. It will thus be apparent that the depression of the pedal member 51 will displace the pitman roller 46 toward the left extremity of the crank arm slot 45 to elevate the platen surface 15 for cooperation with cutting and molding devices to be described hereinafter.

In order to return the instrumentalities thus far described to their initial position after the pedal member 51 has been released, tension springs 57 and 58 are operatively connected to the crank arm 38 and the lower extremity of the pitman 48. To this end, the spring 57 is anchored as at 59 to the forward extremity 37 of the crank arm 38, while the spring 58 is anchored as at 60 to the lower regions of the pitman 48. Both springs 57 and 58 are anchored to the frame member 10 and standards 11 in order to impart an urge to the crank arm 38 and pitman 48 to return to their initial relative positions. While the pedal member 51 is depressed to retain the platen member 14, the springs 57—58 are tensioned beyond their normal length so that they exert a returning influence upon the instrumentalities after the pedal member 51 has been released.

In order to support cutting, molding and ejecting instrumentalities in the path of the platen surface 15, a plurality of brackets 61, in this instance two, are anchored as at 62 to present their forwardly extending and horizontally offset top portions 63 in confronting relation with the platen 14. A downwardly open rectangular housing 64 is welded or otherwise joined to the horizontal surface of the offset top portions 63 that serve to support the housing 64 in confronting relation with the platen 14. The housing 64 is shaped and sized to correspond substantially with the platen 14, the former serving as a retainer and guide for a piston 65 shaped to conform with the interior of the housing 64 for displacement through the lower open end thereof.

The piston 65 is, in this instance, of rectangular construction to provide an interior chamber 66 to receive a thermal medium such as hot water that is circulated therethrough. To this end, inlet and outlet conduits 67 and 68 communicate with the end regions of the piston 65 for connection thereto and to reciprocate therewith. The conduits 67 and 68 are sufficiently long to permit the piston 65 to move relative to the housing 64 within the limits of its depth, and to afford this freedom of movement they project through openings 69 and 70 provided in the top surface of the housing 64.

Suitable water connecting expedients such as flexible rubber hoses 71 and 72 are connected to the extremities of the conduits 67—68 so that a suitable source of hot water can be conveyed thereto. The flexible tubes 71—72 are connected with hand water valves 73 which are interposed in the lines 74 connected thereto so that the volume of circulation of the thermal medium in the chamber 66 of the piston 65 may be controlled to impart and maintain the desired temperature that is conducted to the exterior walls thereof. As shown, the piston 65 has outwardly projecting pins 75 and 76 anchored to the end walls thereof to project through slots 77 and 78, in this instance two, provided in the end walls of the housing 64. It will be apparent, therefore, that the piston 65 will reciprocate in the housing 64 within the limits of the slots 77—78 provided on both opposite end walls thereof without impairing the temperature control thereto in that the flexible hoses 71—72 provide the necessary tolerance of movement for maintaining constant water circulation.

It is to be noted that the piston 65 is normally urged downwardly so that the pins 75—76 engage the lower limit of the slots 77—78 in the housing 64, this being effected, in this instance, by compression coil springs 79 and 80 which are interposed between the top of the housing 64 and the corresponding confronting wall of the piston 65. So that the influence of the springs 79—80 may be adjusted to meet the requirements, threaded studs 81 and 82 project through the bosses 83 and 84 formed on the upper wall of the housing 64 to project therein for axial alignment with the springs 79—80, respectively.

To this end, the threaded studs 81—82 are provided with flanged extremities 85—86 that have axially disposed nibs 87—88 extending therefrom to project within the confines of the springs 79—80 for retaining them in proper alignment. The springs 79—80 will, therefore, normally urge the piston 65 to its extreme downward position. As shown, the lower wall 89 of the piston 65 has a plate 90 sized to correspond therewith, it being disposed adjacent thereto for detachable association to support a plurality of individual molding dies 91 that are uniformly spaced over the surface extent of the plate 90 to depend therefrom.

Figure 6:
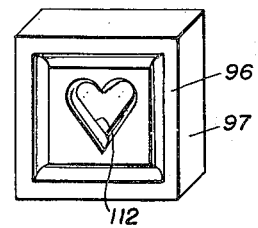
Figure 6 is a perspective view of an individual segment resulting from the use of the instrumentalities shown in the preceding figures.

The molding dies 91 are detachably connected to the plate 90 for support therefrom by means of threaded screws 92 that extend through the plate 90 to threadedly engage an axial hub 93 formed on each of the molding dies 91, thereby securing them in the desired aligned and spaced relation. Any suitable configurating or design impression 94 may be provided on the dies 91 to impress a corresponding surface design on individual tabs or segments of edible plastics such as butter. It is preferable though not essential that each of the impressions 94 formed on the dies 91 should possess more depth and extend beyond the peripheral shoulder design ridge 95 formed on each of the impression dies 91 in order to define and impress a peripheral shoulder 96 on the resulting edible tab or segment 97 (Figure 6).

This assists in forming an enclosure to collect and compress the air that is caught in between the plastic tab 97 and its respective molding die 91, thereby serving to subject such to pressure, which is responsible in destroying an adhesion between the molding dies 91 and the individual tabs 97. In short, the compressed air that is trapped in each tab 97 during the molding thereof, assists in the ejection and severance between the molding die 91 and the tab 97 that has surface impression therewith.

It is to be noted that the plurality of molding dies 91 are arranged on the plate 90 to present linear intersecting spaces 98 therebetween to permit and provide room for a plurality of intersecting and transversely disposed cutting blades 99—100. The cutting blades 99—100 are provided with complemental slits therebetween or are interslitted to define rectangular openings 101 therebetween to freely receive the molding dies 91 therein without presenting any obstruction thereto. The intersecting cutting blades 99—100 bridge a flanged frame 102 for attachment thereto in order to constitute an integral and unitary cutter for the plastic slab 17 of a size corresponding to the interior size of the cutter frame 102. As shown, the cutter frame 102 has upstanding side walls 103 which are sized to interiorly receive a correspondingly shaped and somewhat smaller depending walls of the housing 64.

To permit the detachable connection of the cutter frame 102 with the housing 64, the latter is provided with laterally projecting studs 104 and 105 that are anchored in the side walls of the housing 64 proximate to their lower open end. Wing nuts 106 and 107 threadedly engage the laterally extending studs 104—105 to frictionally engage the side walls 103 of the cutter frame 102 that are provided with slots 108 along a lateral median line to cooperate with the studs 104—105. Consequently, the wing nuts 106—107 will engage the frame walls 103 in the region of the slots 108 to retain the cutter frame in fixed relation with the housing 64 to constitute the lower end surface thereof.

It will be apparent that the molding die supporting plate 90 is maintained in assembled relation with the housing 64 against accidental removal therefrom by the cutter frame 102 that serves as a downward limit thereof. This is possible without precluding or obstructing the inward movement of the plate 90 with its individual dies 91 during the impression and cutting operation that will be described more fully hereinafter.

Figure 8:
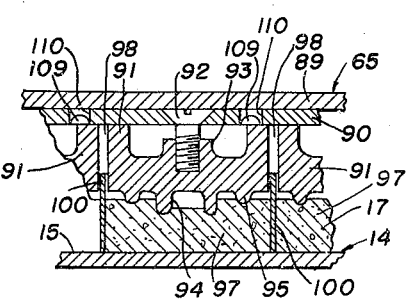
Figure 8 is a fragmentary sectional view taken substantially along line VIII—VIII of Figure 3 with the edible cutting and molding devices shown at the extreme end of their operative stroke prior to returning to their initial relation.
Figure 10:
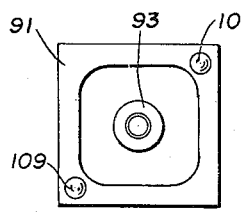
Figure 10 is a top plan view of the individual molding die.
Figure 11:
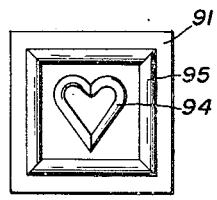
Figure 11 is a bottom plan view of the individual molding die.

To preclude the rotary displacement of the molding dies 91 and to afford the accurate registry thereof in combination with the plate 90, each molding die 91 is provided with diagonally spaced spherical knobs 109, in this instance two, that register with apertures 110 provided and correspondingly spaced in the die supporting plate 90 (Figure 8), thereby precluding accidental rotation or displacement even though only a single axial securing screw fastener 92 is utilized to connect each of the molding dies 91 to the plate 90.

It will also be noted that the slab guide member 18 on the platen 14 (Figure 4) is provided with transverse notches 111 spaced to correspond with the transverse cutter blades 100 to accommodate the extremities thereof that would otherwise engage thereagainst to preclude the full displacement of the cutter 99—100 through the plastic material 17.

It will be apparent from the foregoing that the supporting plate 90 together with the individual molding dies 91 are maintained at the desired temperature consistent with various impressions of the plastic material without any adhesion therebetween.

Figure 7:
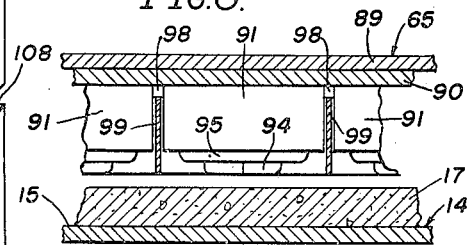
Figure 7 is a fragmentary sectional view taken substantially along line VII—VII of Figure 3 with the edible slab and combined molding and cutting instrumentalities shown in spaced relation prior to effecting the initial operation thereof.

Further, as the platen 14 is elevated responsive to exerting the downward displacement of the pedal member 51, the cutter blades 99—100 will project through the plastic slab 17 to effect the severance thereof into a multiple or plurality of segments 97 and simultaneously elevate the dies 91 relative thereto (Figure 8) in that the springs 79—80 will yield until they are fully compressed. Thereupon, the further elevated upward displacement of the platen 14 will cause the individual dies 91 to impress the individual plastic segments 17 to impart the desired shoulder 96 thereto and impress corresponding surface designs 112 constituting complements of the mold designs 94 (Figure 7).

During this operation, the air that was trapped between the molding dies 91 and the segments 97 cut from the slabs 17, will be subjected to increased pressure tending to reduce the air volume. The upstanding peripheral shoulder 96 thereon serves to trap the compressed air in the centrally counter-impressed region or area of each segment 97. This coupled with the simultaneous compression of the springs 79—80 provides increased energy, serving as combined ejecting influences for the segments 97 as the pedal member 51 is released to permit the piston 65 to assume its initial position relative to the cutter blades 99—100. The surface impressed and segmented butter tabs 97 will then be deposited upon the paper liner 24. This relative displacement between the molding dies 91 and cutter blades 99—100 provides automatic ejection and the air compressed between the dies 91 and the plastic slab 17, serves to preclude sticking or adhesion therebetween that would be highly undesirable.

It should be noted that in the elevation of the platen 14 responsive to the actuation of the pedal 51, the cooperative relation thereof with the edges of the intersecting blades 99—100 can be such as to preclude direct contact therebetween and cause their approach within a minute separated distance of not more than 1/64 of an inch. This precludes cutting entirely through the paper liner 24 so that it may serve as the handling medium for the segments 97 cut from the plastic slab 17. Then, too, the stroke or reciprocation of the platen 14 may be such to even avoid cutting entirely through the plastic slabs 17 so that there is a minute body or connecting mass below the intersecting cutting or score lines effected by the cutter blades 99—100 to maintain the readily separable continuity therebetween.

This will provide a plurality of adhering segments 97 which can be successively separated by resort to a butter knife or other utensil commonly employed in their serving. It will be apparent, therefore, that the plastic slabs 17 may be converted into a great variety of segments 97 of varying shapes and surface impressions depending upon the dictates of commercial practice and the requirements of any particular customer. Impression of surface designs such as monograms, names, insignias or other surface designs can be accomplished without resort to any additional steps in the operation of the device so that there is no increase in cost beyond that required to effect the severance of the plastic slabs 17 into a plurality of segments 97 of the desired size, configuration and shape.

Consequently combined cutting, molding and ejecting instrumentalities have been provided in the forming housing 64 that compresses the upper platen surface 15 without requiring the attendant to exert any other operation than positioning the initial plastic slab 17 on the platen surface 15 by resort to the guide 18 and thereupon depress the pedal member 51 to elevate the platen 14 in engagement with the housing 64 having its lower end provided with the forming dies 91 and cutter frame 102. Further elevation of the platen 14 effects frictional displacement between the slab 17 and forming dies 91 together with the cutter 102 until the spring 79—80 are compressed to serve as ejecting instrumentalities as described herein.

It will thus be apparent that a very simple, inexpensive and highly efficient butter or other edible plastic cutting, molding, and ejecting instrumentalities have been combined to be operative responsive to a single movement imparted by an actuator such as the pedal 51. Then, too, the molding dies 91 are detachable either individually or through their plate 90 to render cleaning possible without entailing any appreciable time and to substitute dies for affording a wide range of surface impressions to be imparted to plastic slabs such as butter and the like.

Various changes may be made in the embodiment of the invention herein specifically described without departing from the invention or sacrificing any of the advantages or features thereof, and nothing herein shall be construed as limitations upon the invention, its concept or structural embodiment as to the whole or any part thereof except as defined in the appended claims.

We claim:

1. In a device of the character described, the combination with a supporting member, of die supporting plate means associated with said supporting member, a plurality of uniformly spaced dies detachably secured to said supporting plate, cutting blades interposed between said spaced dies, said cutting blades and die supporting plate being mounted for movement relative to each other on said supporting member, and a platen movably mounted relative to said supporting member for displacing slabs of plastic material in the path of said cutting blades and surface impressing dies.

2. In a device of the character described, the combination with a supporting member, of die supporting plate means detachably associated with said supporting member, a plurality of uniformly spaced dies detachably secured to said supporting plate, cutting blades interposed between said spaced dies, said cutting blades and die supporting plate being mounted for movement relative to each other on said supporting member, a platen movably mounted relative to said supporting member for displacing slabs of plastic material in the path of said cutting blades and surface impressing dies, and means for circulating a thermal medium through said supporting member.

3. In a device of the character described, the combination with a supporting member, of die supporting plate means associated with said supporting member, a plurality of uniformly spaced dies detachably secured to said supporting plate, cutting blades interposed between said spaced dies, said cutting blades and die supporting plate being mounted for movement relative to each other on said supporting member, a platen movably mounted relative to said supporting member for displacing slabs of plastic material in the path of said cutting blades and surface impressing dies, and means for displacing said platen relative to said supporting member.

4. In a device of the character described, the combination with a supporting member, of die supporting plate means associated with said supporting member, a plurality of uniformly spaced dies detachably secured to said supporting plate, cutting blades interposed between said spaced dies, said cutting blades and die supporting plate being mounted for movement relative to each other on said supporting member, spring means interposed between said supporting member and said die supporting plate, and a platen movably mounted relative to said supporting member for displacing slabs of plastic material in the path of said cutting blades and surface impressing dies.

5. In a device of the character described, the combination with a supporting member, of die supporting plate means associated with said supporting member, a plurality of uniformly spaced dies detachably secured to said supporting plate, cutting blades interposed between said spaced dies for attachment to said supporting member, said cutting blades and die supporting plate being mounted for movement relative to each other on said supporting member, spring means interposed between said supporting member and said die supporting plate, and a platen movably mounted relative to said supporting member for displacing slabs of plastic material in the path of said cutting blades and surface impressing dies.

6. In a device of the character described, the combination with confronting members, of means for displacing said members relatively to each other, cutting means on one of said members to cooperate with the other of said members, surface impressing means mounted on the same member with said cutting means for movement relative thereto, the other of said members being a substance supporting platen to coact with said cutting means through the medium of a plastic material therebetween, said surface impressing means comprising individual dies and a rigid holder therefor, said cutting means comprising severing members and a holder therefor, spring means interposed between said holders for mounting the former holder so as to be capable of motion relative to the latter holder, and temperature control means operatively connected to said cutting and surface impressing means to facilitate the conversion of a plastic material to a plurality of surface impressed segments.

7. In a device of the character described, the combination with confronting members, of means for displacing said members relatively to each other, cutting means on one of said members to cooperate with the other of said members, surface impressing means mounted on the same member with said cutting means for movement relative thereto, the other of said members being a substance supporting platen to coact with said cutting means through the medium of a plastic material therebetween, said surface impressing means comprising individual rectangular dies and a rigid holder therefor, said cutting means comprising intersecting blades between said rectangular dies and a holder on which said blades are rigidly mounted, spring means interposed between said holders for mounting the former holder so as to be capable of motion relative to the latter holder, and temperature control means operatively connected to said cutting and surface impressing means to facilitate the conversion of a plastic material to a plurality of surface impressed segments.

8. In a device of the character described, the combination with confronting members, of means for displacing said members relative to each other, cutting means on one of said members to cooperate with the other of said members, surface impressing means mounted on the same member with said cutting means for movement relative thereto, the other of said members being a substance supporting platen to coact with said cutting means through the medium of a plastic material therebetween, said surface impressing means comprising individual dies and a rigid holder therefor, said cutting means comprising severing members and a holder therefor, and spring means interposed between said holders for mounting the former holder so as to be capable of motion relative to the latter holder.

9. In a device of the character described, the combination with confronting members, of means for displacing said members relatively to each other, cutting means on one of said members to cooperate with the other of said members, surface impressing means mounted on the same member with said cutting means for movement relative thereto, the other of said members being a substance supporting platen to coact with said cutting means through the medium of a plastic material therebetween, said surface impressing means comprising individual rectangular dies and a rigid holder therefor, said cutting means comprising intersecting blades between said rectangular dies and holder therefor, and spring means interposed between said holders for mounting the former holder so as to be capable of motion relative to the latter holder.

10. In a device of the character described, the combination with confronting members, of means for displacing said members relatively to each other, cutting means on one of said members to cooperate with the other of said members, surface impressing means mounted on the same member with said cutting means for movement relative thereto, said surface impressing means comprising individual dies and a rigid holder therefor, said cutting means comprising blades defining an outline for each of said dies, a holder for said blades, the other of said members being a substance supporting platen to coact with said cutting and impressing means simultaneously with said cutting means through the medium of a plastic material therebetween, spring means interposed between the holders of said cutting and impressing means for mounting the former holder so as to be capable of motion relative to the latter holder, and a peripheral upstanding edge around said surface impressing means to entrap the compressed air between the surface of said latter means and the plastic material to be impressed therewith, thereby supplementing said spring means in ejecting the segments from the cutting means.

11. In a device of the character described, the combination with confronting members, of means for displacing said members relatively to each other, cutting means on one of said members to cooperate with the other of said members, surface impressing means mounted on the same member with said cutting means for movement relative thereto, the other of said members being a substance supporting platen to coact with said cutting means through the medium of a plastic material therebetween, said surface impressing means comprising individual dies and a rigid holder therefor, said cutting means comprising severing members and a holder therefor, spring means interposed between said holders for mounting the former holder so as to be capable of motion relative to the latter holder, a peripheral upstanding edge around said surface impressing means to entrap the compressed air between the surface of said latter means and the plastic material to be impressed therewith, thereby supplementing said spring means in ejecting the segments from the cutting means, and temperature control means operatively connected to said cutting and surface impressing means to facilitate the conversion of a plastic material to a plurality of surface impressed segments.

HENRY H. DOERING.
BERT J. SKOGLUND.